United States Patent
May et al.

(10) Patent No.: US 7,530,332 B2
(45) Date of Patent: May 12, 2009

(54) LIVESTOCK RESTRAINING GATE

(76) Inventors: Arlen May, 620 Cox, Duncan, OK (US) 73533; Keith May, 620 Cox, Duncan, OK (US) 73533; Linda May, 620 Cox, Duncan, OK (US) 73533

( * ) Notice: Subject to any disclaimer, the term of this patent is extended or adjusted under 35 U.S.C. 154(b) by 423 days.

(21) Appl. No.: 11/231,914

(22) Filed: Sep. 21, 2005

(65) Prior Publication Data
US 2006/0065209 A1 Mar. 30, 2006

Related U.S. Application Data

(60) Provisional application No. 60/614,174, filed on Sep. 29, 2004.

(51) Int. Cl.
*A01K 15/04* (2006.01)
(52) U.S. Cl. ................ 119/502; 119/524
(58) Field of Classification Search ........... 119/502, 119/507, 510, 523, 522, 524, 751, 752, 738, 119/743
See application file for complete search history.

(56) References Cited

U.S. PATENT DOCUMENTS

| | | | | |
|---|---|---|---|---|
| 369,333 A * | 9/1887 | Gibbs | ........... | 119/524 |
| 2,547,426 A * | 4/1951 | Youngman | ........... | 119/521 |
| 3,166,044 A * | 1/1965 | Darling | ........... | 119/524 |
| 3,415,227 A * | 12/1968 | Welsh | ........... | 119/524 |
| 3,742,910 A * | 7/1973 | Ridding | ........... | 119/524 |
| 3,785,346 A * | 1/1974 | Dower | ........... | 119/524 |
| 3,805,741 A * | 4/1974 | Thompson et al. | ........... | 119/510 |
| 4,129,096 A * | 12/1978 | Nickel | ........... | 119/521 |
| 4,294,196 A * | 10/1981 | Larsen | ........... | 119/524 |
| 4,567,851 A * | 2/1986 | Larsen | ........... | 119/524 |
| 5,203,280 A * | 4/1993 | Nelson | ........... | 119/14.03 |
| 5,222,459 A * | 6/1993 | Johnson | ........... | 119/330 |
| 5,230,299 A * | 7/1993 | Moreau | ........... | 119/14.03 |
| 5,285,746 A * | 2/1994 | Moreau | ........... | 119/14.03 |
| 5,441,016 A * | 8/1995 | Ricketts | ........... | 119/723 |
| 5,584,261 A * | 12/1996 | Hart et al. | ........... | 119/14.03 |
| 5,638,768 A * | 6/1997 | Moreau | ........... | 119/14.03 |

(Continued)

FOREIGN PATENT DOCUMENTS

JP 04281728 A * 10/1992

*Primary Examiner*—Yvonne R. Abbott
(74) *Attorney, Agent, or Firm*—Dunlap Codding, P.C.

(57) ABSTRACT

A portable gate assembly for use in combination with a corral or holding pen to capture wild or renegade cows is disclosed. The portable gate assembly includes a frame defining a frame opening extending therethrough, the frame opening being sized such that the cow sought to be captured can pass therethrough. A gate is pivotally connected to the frame such that the gate is selectively movable between a first position and a second position. In the first position the gate is positioned in at least a portion of the frame opening such that the lower end of the gate is disposed a distance above the ground to permit at least a portion of the cows head to the position thereunder, in the second position the gate being moved inwardly and upwardly into the corral or holding pen and over the back of the cow when the cow moves through the frame opening and into the corral or holding pen. To prevent the cow from escaping, once captured, the portable gate assembly further includes at least one stop member connected to at least one of the frame and the gate for preventing outward movement of the gate and thereby escape of the captured cow through the frame opening.

7 Claims, 3 Drawing Sheets

U.S. PATENT DOCUMENTS 5,803,015 A * 9/1998 Rhodes et al. ........... 119/14.02
5,970,920 A * 10/1999 Peacock .................... 119/738
6,394,027 B2 * 5/2002 Gallagher et al. ........ 119/14.03
6,834,618 B2 * 12/2004 Pickin et al. ................ 119/524

* cited by examiner

LIVESTOCK RESTRAINING GATE

CROSS REFERENCE TO RELATED APPLICATIONS

This application claims benefit of provisional application U.S. Ser. No. 60/614,174, filed Sep. 29, 2004, entitled "LIVESTOCK RESTRAINING GATE."

BACKGROUND OF THE INVENTION

1. Field of the Invention

The present invention relates to cattle gates, and more particularly but not by way of limitation, to a portable cattle gate attachable to a corral for capturing renegade or wild cattle.

2. Brief Description of the Prior Art

When rounding up cattle so that the cattle can be vaccinated or otherwise worked, often one or more head of the cattle are reluctant to enter the corral with the rest of the herd and are difficult to drive into the corral. In the past, the herd was isolated in a portion of the corral, feed was placed in the corral near an open gate, and the rancher would hide so as not to distract the renegade cattle. Once the rancher was out of sight, the renegade cattle would eventually enter the corral to eat the feed disposed therein. The rancher, who was watching the cattle from a distance , then rapidly moved in and attempted to shut the corral gate while the renegade cattle remained within the corral.

The capturing of renegade cattle can not only be tedious but time consuming. Therefore, a need has long existed for a method and apparatus for capturing renegade cattle within a corral without requiring the rancher to devote long periods of time waiting for the renegade cattle to enter the corral. It is to such a method and apparatus that the present is directed.

SUMMARY OF THE INVENTION

The present invention relates to a portable gate assembly for use in combination with a corral or holding pen to capture wild or renegade cows. The portable gate assembly includes a frame connectable to a support structure defining an access opening to the corral or holding pen. The frame is provided with a frame opening sized such that a cow sought to be captured can pass through the frame opening and into the corral or holding pen. A gate having an upper end and a lower end is pivotally connected to the frame via the upper end thereof so that the gate is selectively movable between a first position and a second position. In the first position the gate is positioned in at least a portion of the frame opening such that the lower end of the gate is disposed a distance above the ground to permit at least a portion of the cows head to be positioned thereunder. In the second position, the gate is moved inwardly and upwardly into the corral or the holding pen and over the back of the cow as the cow moves through the frame opening and into the corral or holding pen whereupon, after passage of the cow under the gate, the gate returns to the first position. In order to prevent the cow from escaping via the gate once the cow has been captured in the corral or holding pen, the portable gate assembly further includes at least one stop member connected to at least one of the frame and the gate for preventing outward movement of the gate and thereby prevent escape of the captured cow through the frame opening.

An object of the present invention is to provide a portable gate assembly for use in combination with a corral or holding pen which will permit wild or renegade cows to be captured without a ranchers spending time to observe the capture.

Another object of the present invention, while achieving the before stated object, and to provide a portable gate assembly for use in combination with a corral or holding pen to capture wild and renegade cows which is durable and economical to manufacture.

In another object of the present invention is to provide a portable gate assembly for use in combination with a corral or holding pen to capture wild or renegade cows which can be readily incorporated into any existing corral or holding pen having an excess opening provided therein. Other objects, advantages and features of the present invention will be apparent to those skilled in the art from the following detailed description when read in conjunction with accompanying drawings and amended claims.

DETAILED DESCRIPTION

A herd of cattle generally includes at least one bull, a plurality of cows, steers and yearlings or baby calves, including bull and heifer yearlings and calves. For the sake of simplicity, the term "cow" will be used herein generically in the description of the gate assembly of the present invention. Thus, the term "cow" encompasses all gender of cattle.

Figure 1:
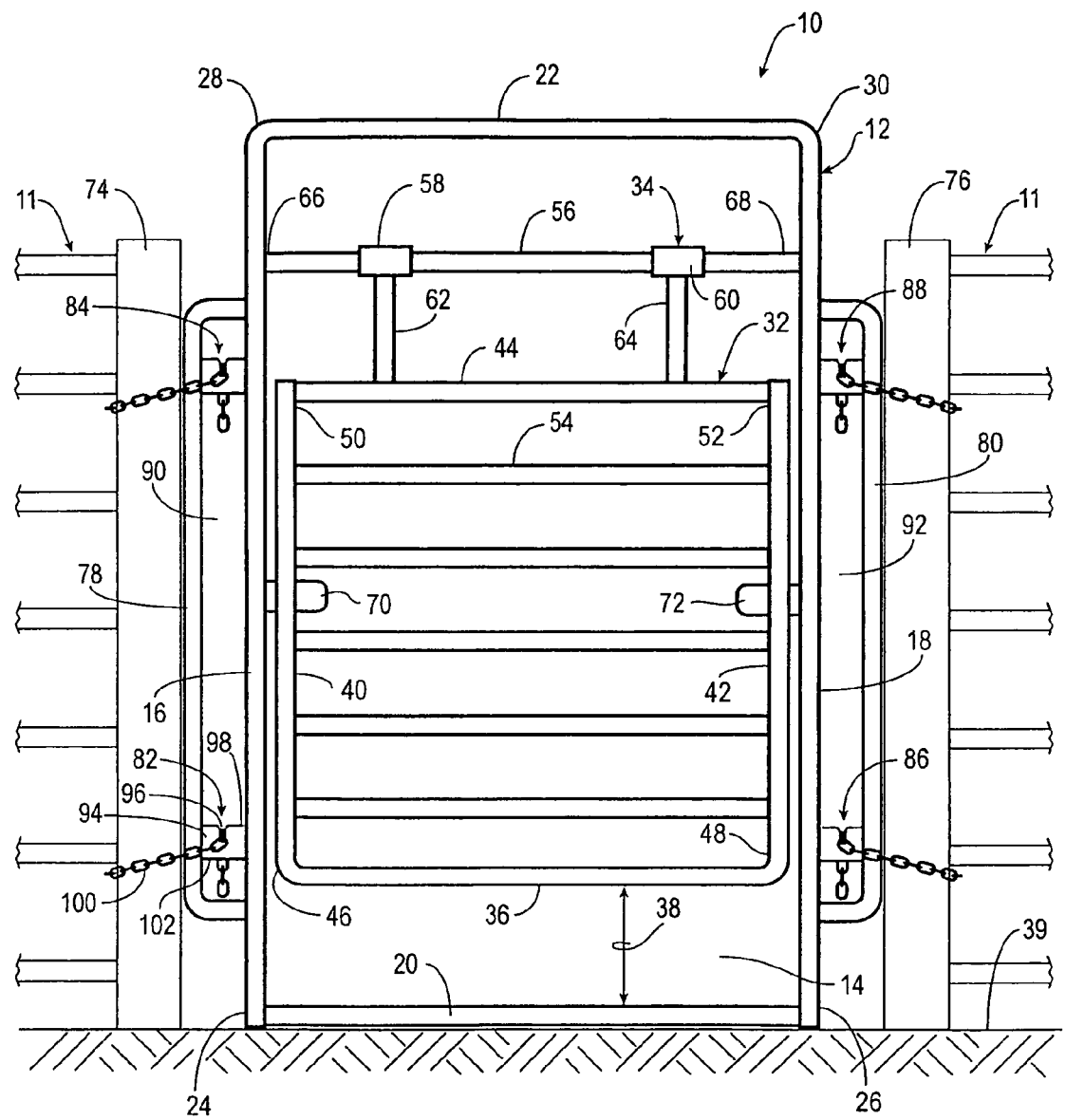
FIG. 1 is a front elevational view of a gate assembly constructed in accordance with the present invention, the gate assembly being connected to substantially parallel, spatially disposed posts of a corral.

Referring now to the drawings, and more particularly to FIG. 1, shown therein is a portable gate assembly 10 of the present invention connected to substantially parallel, spatially disposed posts of a corral or holding pen. It should be understood that the portable gate assembly 10 can be secured to one post of the corral or holding pen 11 and a portion of a gate of the corral or holding pen 11 or to any other structure which will allow entry of a cow into the corral or holding pen 11, while preventing the cow from exiting the corral or holding pen 11 via the portable gate assembly 10.

The portable gate assembly 10 is provided with an upright, substantially rectangular-shaped frame 12 having a frame opening 14 extending therethrough, the frame opening 14 being sized to permit a cow to enter and pass through the frame opening 14 as will described in more detail hereinafter. The frame 12 includes a first side member 16, a substantially parallel, spatially disposed second side member 18, a first or lower brace 20, and a second or upper brace 22. The first or lower brace 20 extends between and is connected to first ends 24 and 26 of the first and second side members 16 and 18, respectively; and the second or upper brace 22 extends between and is connected to second ends 28 and 30 of the first and second side members 16 and 18, respectively.

Figure 3:
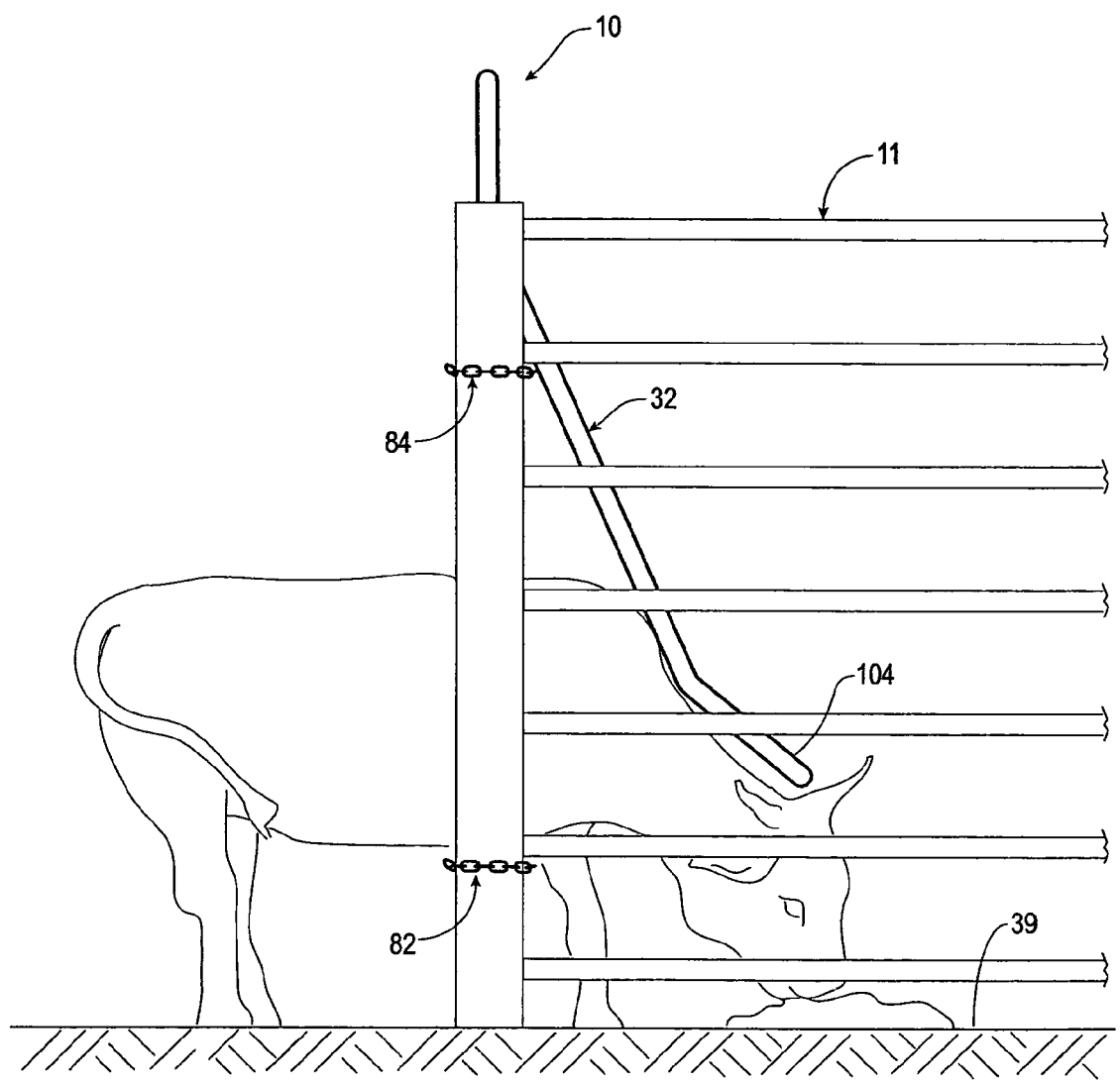
FIG. 3 is a side elevational view of the gate assembly of FIG. 1 connected to the substantially parallel, spatially disposed posts of the corral, the gate shown being pivoted in a forward direction as a cow enters the corral for capture by the gate assembly.

The portable gate assembly 10 further includes a gate 32 disposed within the frame opening 14, the gate 32 being connected to the frame 12 by a hangar assembly 34 so that the gate 32 is selectively movable between a first or lowered position substantially as shown in FIG. 1, and a second or raised position which allows the cow to pass there under and into the corral. FIG. 3 illustrates the gate 32 in a partially second or raised position.

In the first or lowered position, a first or lower end member 36 of the gate 32 is disposed a distance 38 above the lower brace 20 of the frame 12 which is disposed adjacent the ground or supporting surface 39 for the portable gate assembly 10. The distance 38 between the first or lower end member 36 of the gate 32 and the lower brace 20 of the frame 12 can vary widely, the only requirement being that the distance 38 be sufficient to allow at least a portion of the head of the cow to be positioned thereunder when the cow is eating feed deposited on the ground, but which will prevent the cow from escaping once trapped. While the distance 38 between the first or lower end member 36 of the gate 32 and the lower brace 20 of the frame 12 can vary widely, desirable results have been obtained when the distance 38 is about 12 inches.

As the cow to be captured approaches the portable gate assembly 10, the cow observes the feed positioned below the first or lower end member 36 of the gate 32 and which extends a distance inwardly into the corral or holding pen 11. The feed is further spread inwardly a sufficient distance so that as the cow eats the feed, the neck of the cow engages the first or lower end member 36 of the gate and continued forward movement of the cow through the frame opening 14 causes the gate 32 to be moved inwardly and upwardly over the cow's back until such time as the cow has completely entered into the corral or holding pen 11 at which time the gate 32 slides off the cow and the gate 32 moves to the first position where it is secured in a stable position for preventing outward movement of the portable gate assembly 10 and thus escape of the animal from the corral of holding pen 11 via the frame opening 14.

The gate 32, which has a width less than the width of the frame 12, includes a first side member 40, a substantially parallel, spatially disposed second side member 42, the first or lower end member 36 and a second or upper end member 44. The first or lower end member 36 of the gate 32 extends between and is connected to first ends 46 and 48 of the first and second side members 40 and 42, respectively; and the second or upper end member 44 of the gate 32 extends between and is connected to second ends 50 and 52 of the first and second side members 40 and 42, respectively. A plurality of cross brace members 54 are disposed between the lower end member 36 and the upper end member 44 of the gate 32, each of the cross brace members 54 extending between and connected to the first and second side member 40 and 42 of the gate 32 for providing structural integrity to the gate 32 and to provide a barrier to prevent the cow from exiting the corral or holding pen 11 via the frame opening 14 and the gate 32 once the cow has passed under the gate 32. The number of cross brace members 54 can vary depending on the overall size of the gate 32. In addition, if desired, the gate 32 can be formed of a substantially solid material.

The hinge assembly 34 for connecting the gate 32 to the frame 12 includes a substantially horizontally disposed cross brace member 56, and at least one sleeve, and more desirably a plurality of sleeves 58 and 60, rotatably supported on the substantially horizontally disposed cross brace member 56 and at least one linkage member and more desirably a plurality of linkage members 62 and 64, which connect the second or upper end member 44 of the gate 32 to the sleeve 58 and 60 of the hinge assembly 34. The substantially horizontally disposed cross brace member 56, which is desirably disposed between the upper end member 44 of the gate 32 and the upper brace 22 of the frame 12, is provided with a first end 66 and an opposed second end 68. The first end 66 of the substantially horizontally disposed cross brace member 56 is connected to the first side member 60 of the frame 12, and the opposed second end 68 of the substantially horizontally disposed cross brace member 56 is connected to the second side member 18 of the frame 12 such that the substantially horizontally disposed cross brace member 56 is disposed a distance above the gate 32 of the portable gate assembly 10 substantially as shown in FIG. 1.

As previously stated, the first and second sleeves 58 and 60 are rotatably mounted on the substantially horizontally disposed cross member 56 and the gate 32 is connected to the sleeves 58 and 60 via the respective linkages 62 and 64. Thus, the sleeves 58 and 60, in combination with the linkages 62 and 64 provide stability to the gate 32 when the gate 32 is moved between the first or lowered position and the second or raised position.

While the hinge assembly 34 for connecting the gate 32 to the frame 12 has been illustrated as including a plurality of sleeves and linkage members, such as the sleeves 58 and 60 and the linkage members 62 and 64, it should be understood that only one sleeve can be employed which in turn would require only one linkage member or a plurality of linkage members for pivotally connected the gate to the frame as described above; or, if desired, more than two sleeves can be employed in the hinge assembly 34 which in turn, would require the same number of linkages for connecting the gate 32 to the frame 12.

To prevent the gate 32 from swinging backwards once the cow has been trapped in the corral or holding pen 11, and thereby prevent the cow from escaping the corral or holding pen 11, the portable gate assembly 10 further includes a pair of stop members 70 and 72. The stop member 70 is connected to the first side member 16 of the frame 12 so as to extend inwardly a distance into the opening 14 defined by the frame 12; and the stop member 72 is connected to the second side member 18 so as to extend inwardly a distance into the opening 14 defined by the frame 12. Thus, the stop member 70 is adapted to engage the first side member 40 of the gate 32 and the stop member 72 is adapted to engage the second side member 42 of the gate 32 so as to prevent movement of the gate 32 in a outward direction relative to the frame 12 and thereby prevent escape of the captured cow from the corral 11.

While the portable gate assembly 10 has been illustrated as containing a pair of stop members 70 and 72, it should be understood that if desired only one stop member could be constructed which would function in a similar manner as the stop members 70 and 72. Further, if desired, the stock members, such as stop members 70 and 72 can be connected to the first and second side members 40 and 42 of the gate 32 such that the stop members cooperate with the frame 12 to prevent outward movement of the gate 32 and thereby prevent escape of the captured cow through the gate 32 and thus the frame opening 14.

In order to connect the frame 12 of the portable gate assembly 10 to supporting structures such as posts 74 and 76, the portable gate assembly 10 further includes a first extension member 78 and a second extension member 80. The first extension member 78 is connected to the first side member 16 of the frame 12 so as to extend outwardly therefrom and the second extension member 80 is connected to the second side member 18 of the frame 12 so as to extend outwardly. The first and second extension members 78 and 80 are each provided with a substantially U-shaped configuration. Further, the first and second extension members 78 and 80 are provided with a sufficient length to enhance stability of the connection of the frame 12 of the portable gate assembly 10 to supporting members, such as the posts 74 and 76 as shown in FIG. 1.

In order to secure the gate assembly 10 to the posts 74 and 76, the gate assembly 10 is further provided with a plurality of connector assemblies 82, 84, 86 and 88 for connecting the first and second extension member 78 and 80, and thus the frame 12 to adjacently disposed support structure defining the access opening 14 of the frame 12, such as the posts 74 and 76. The connector assemblies 82 and 84 are disposed within an opening 90 formed between the first side member 16 of the frame 12 and the first extension member 78; and the connector assemblies 86 and 88 are disposed within an opening 92 formed between the second side member 18 of the frame 12 and the second extension member 80. The connector assemblies 82, 84, 86 and 88 are similar in construction and function. Thus, only the connector assembly 82 will be described in detail hereinafter.

The connector assembly 82 is provided with a plate 94 having a substantially V-shaped notch or slot 96 extending inwardly from an upper side 98 of the plate 94. The plate 94 is disposed within the opening 90 and connected to the first side member 16 of the frame 14 and the first extension member 78. A chain 100 is connected at one end 102 to either the plate 94 or to the first extension member 78 so as to be disposed in close proximity to the plate 94. The chain 100 is provided with a sufficient length so that the chain 100 can be wrapped around the post 74 and connected to the plate 94 by disposing a portion of the chain 100 in the substantially V-shaped notch or slot 96 formed in the plate 94.

The connector assemblies 82 and 84 are desirably positioned so that the connecter assembly 82 is disposed in close proximity to the first or lower end member 36 of the gate 32 when the gate 32 is in the first or lowered position and the connector assembly 84 is disposed in close proximity to the second or upper end member 44 of the gate 32 substantially as shown in FIG. 1. Similarly, the connector assemblies 86 and 88 are desirably positioned so as to be substantially aligned with the connector assemblies 82 and 84, respectively. Thus, the connector assembly 86 is disposed in close proximity to the first or lower end member 36 of the gate 32 when the gate 32 is in the first or lowered position, and the connector assembly 88 is disposed in close proximity to the second or upper member 44 of the gate 32 substantially as shown in FIG. 1.

It should be noted that while the portable gate assembly 10 has been shown as having four connector assemblies, namely, connector assemblies 82, 84, 86 and 88, the portable gate assembly 10 of the present invention is not limited to four such connector assemblies. However, a sufficient connector assemblies should be employed to ensure that the portable gate assembly 10 is securely connected to spatially disposed post or sections of the corral holding pen 11.

Figure 2:
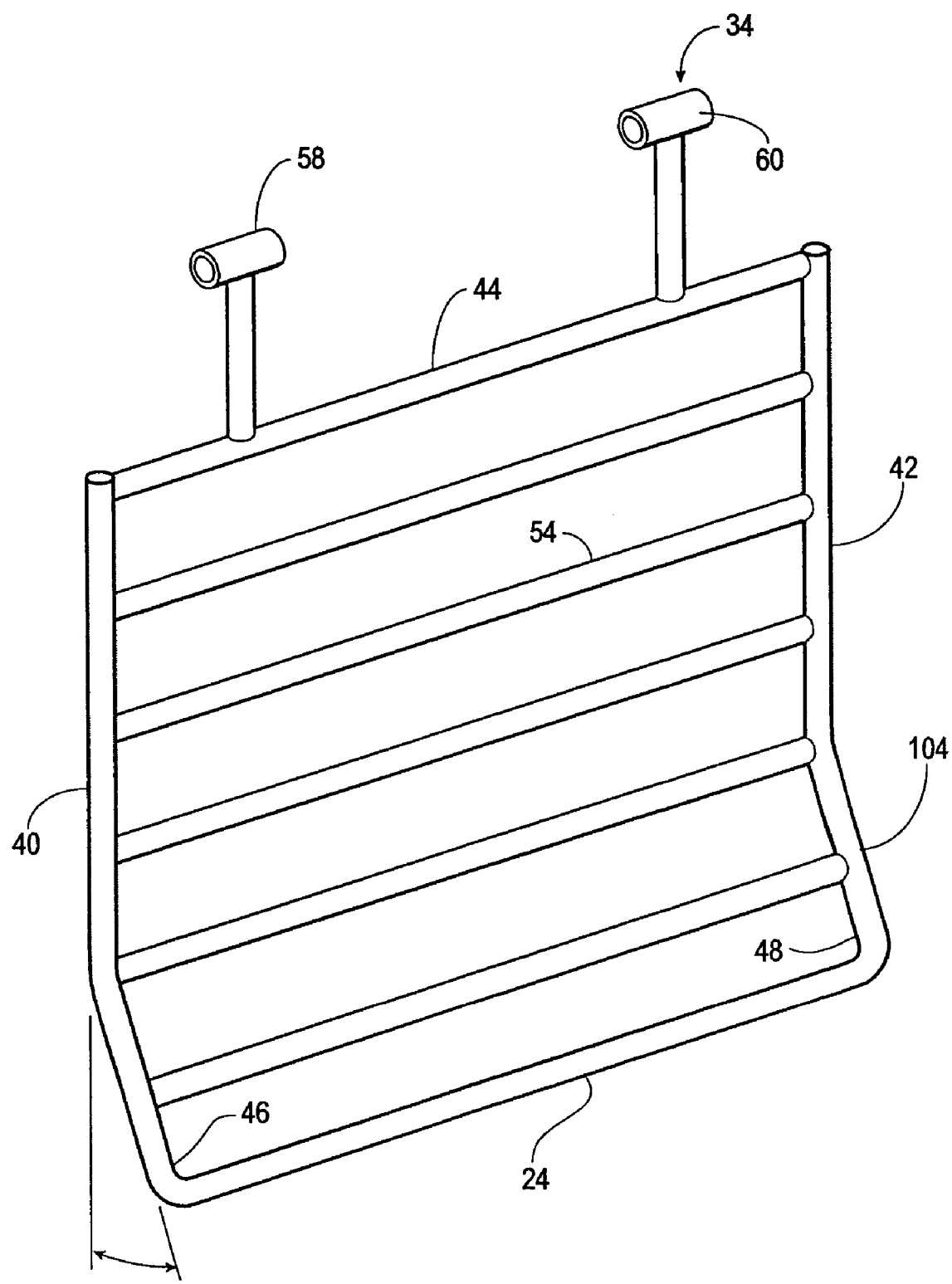
FIG. 2 is a perspective view of a gate of the gate assembly of FIG. 1.

The gate 32 can be a substantially rectangular shaped gate member or a lower end portion 104 of the gate 32 can be angularly disposed inwardly substantially as shown in FIGS. 2 and 3 so as to enhance movement of the cow under the gate 32 and through the frame opening 14 of the frame 12. That is, by angularly disposing the lower end portion 104 of the gate 32 inwardly as shown in FIG. 3, movement of the gate 32 inwardly and over the cow's neck and back is enhanced as the cow moves forward through the frame opening 14 and into the corral or holding pen 11. The angular disposition of the lower end portion 104 of the gate 32 can vary widely. For example, the gate 32 can be provided with no angularly disposed lower end portion, or the angle of the lower end portion 104 of the gate 32 can range up to approximately 30 degrees, and more desirably from about 15 to about 30 degrees relative to an elongated axis of the first and second side members 40 and 42 of the gate 32 substantially as shown in FIG. 2.

In use, the portable gate assembly 10 is connected to two spatially disposed support members, such as the post 74 and 76, or to end members of a corral or a holding pen 11 and the like. The frame 12 is thereafter secured to the support members, such as the posts 74 and 76, by the connector assemblies 82, 84, 86 and 88. Once the portable gate assembly 10 has been secured to the posts 74 and 76, feed is disposed on the ground, preferably just exterior of the corral or holding pen 11, through the frame opening 14 and a sufficient distance into the corral or holding pen 11. After the feed has been properly disposed, the rancher is free to leave the premises. Once the renegade cow discovers the feed, the cow will force itself through the frame opening 14, swinging the gate 32 inwardly so that the gate 32 rides over the back of the cow and, once the cow has passed through the frame opening 14 and cleared the gate 32, the gate 32 will fall or move by gravity to the first or lowered position substantially as shown in FIG. 1 so that the cow is trapped in the corral or holding pen 11. Reverse movement of the gate 32 is prevented by the gate 32 engaging the stop members 70 and 72.

After a period of time the rancher can return to the corral or holding pen 11 and vaccinate or otherwise work the captured cow.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A portable gate assembly for use in combination with a corral or holding pen to capture wild or renegade cows, the portable gate assembly comprising:

a frame having a substantially rectangular shaped configuration, the frame being connectable to a support structure defining an access opening to a corral or holding pen, the frame comprising;

an opening extending there through, the opening sized such that a cow sought to be captured can pass through the opening in the frame and into the corral or holding pen;

a first side member having a first end and an opposed second end;

a substantially parallel, spatially disposed second side member having a first end and an opposed second end;

a lower brace extending between and connected to the first ends of the first and second side members; and an upper brace extending between and connected to the second ends of the first and second side members whereby the first and second side members and the upper and lower braces cooperate to define the opening in the frame;

a gate having a lower end, a lower end portion, and an upper end, the lower end portion of the gate being angularly disposed up to about 30 degrees in an upward, inward direction relative to the frame to enhance movement of the gate up and over the back of the cow as the cow moves through the opening in the frame and into the corral or holding pen, the upper end of the gate pivotally connected to the frame such that the gate is selectively movable between a first position and a second position, in the first position the gate being positioned in at least a portion of the opening in the frame such that the lower end of the gate is disposed about 12 inches above the ground to permit at least a portion of the cow's head to be positioned thereunder, in the second position the gate being moved inwardly and upwardly into the corral or the holding pen and over the back of the cow when the cow moves inwardly into the corral or holding pen whereupon, after passage of the cow under the gate, the gate returns to the first position;

at least one stop member connected to at least one of the frame and the gate for preventing outward movement of the gate and thereby preventing escape of the captured cow through the opening in the frame;

a first extension member connected to the first side member of the frame such that the first extension member extends outwardly from the first side member;

a second extension member connected to the second side member of the frame such that the second extension member extends outwardly from the second side member; and a plurality of connector assemblies for connecting the first and second extension members to the adjacently disposed support structures defining the access opening to the corral or holding pen.

2. The portable gate assembly for use in combination with a corral or holding pen of claim 1 wherein the first and second extension members are provided with a sufficient length to enhance connection of the first and second extension members and the frame to the adjacently disposed support structures defining the access opening to the corral or holding pen, and wherein at least two spatially disposed first connector assemblies are provided for connecting the first extension member to the adjacently disposed support structure and at least two spatially disposed second connector assemblies are provided for connecting the second extension member to the adjacently disposed support structure, and wherein each of the first connector assemblies comprises:

a plate extending between the first side member and the first extension member, the plate having a substantially v-shaped notch formed in a upper side of the plate; and a chain having one end thereof connected to one of the plate or the first extension member in close proximity to the plate, the chain having a sufficient length so that the chain can be wrapped around the adjacently disposed support member and connected to the plate by positioning the chain in the substantially v-shaped notch of the plate; and wherein each of the second connector assemblies comprises:

a plate extending between the second side member and the second extension member, the plate having a substantially v-shaped notch formed in a upper side of the plate; and a chain having one end thereof connected to one of the plate or the second extension member in close proximity to the plate, the chain having a sufficient length so that the chain can be wrapped around the adjacently disposed support member and connected to the plate by positioning the chain in the substantially v-shaped notch of the plate.

3. The portable gate assembly for use in combination with a corral or holding pen of claim 2 wherein the gate further comprises:

a first side member having a first end and a second end;

a substantially parallel, spatially disposed second side member having a first end and a second end;

a lower end member extending between and connected to the first ends of the first and second side members;

an upper end member extending between and connected to the second ends of the first and second side members; and a plurality of cross brace members extending between and connected to the first and second side members, the cross brace members being disposed between the lower end member and the upper end member so as to provide structural integrity to the gate and to provide a barrier to prevent the cow from exiting the corral via the gate and the frame opening.

4. The portable gate assembly for use in combination with a corral or holding pen of claim 3 further comprising a hinge assembly for pivotally connecting the gate to the frame whereby the gate is selectively movable between the first position and the second position, the hinge assembly comprising:

a substantially horizontally disposed cross brace member having a first end and an opposed second end, the first end of the substantially horizontally disposed cross brace member connected to the first side member of the frame and the opposed second of the substantially horizontally disposed cross brace member connected to the second side member of the frame such that the substantially horizontally disposed cross brace member is disposed a distance above the upper end of the gate;

at least one sleeve rotatably supported on the substantially horizontally disposed cross brace member; and at least one linkage member connected to the upper end of the gate and to the at least one sleeve so that the gate can be selectively moved between the first position and the second position.

5. A portable gate assembly for use in combination with a corral or holding pen to capture wild or renegade cows, the portable gate assembly comprising:

a frame provided with a substantially rectangular-shaped configuration, and connectable to a support structure defining an access opening to a corral or holding pen, the frame having a frame opening extending there through, the frame opening sized such that a cow sought to be captured can pass through the frame opening and into the corral or holding pen;

a first side member having a first end and an opposed second end;

a substantially parallel, spatially disposed second side member having a first end and an opposed second end;

a lower brace extending between and connected to the first ends of the first and second side members; and an upper brace extending between and connected to the second ends of the first and second side members whereby the first and second side members and the upper and lower braces cooperate to define the frame opening;

a gate having an upper end and a lower end, the upper end of the gate pivotally connected to the frame such that the gate is selectively movable between a first position and a second position, in the first position the gate being positioned in at least a portion of the frame opening such that the lower end of the gate is disposed a sufficient distance above the ground to permit at least a portion of the cow's head to be positioned thereunder, in the second position the gate being moved inwardly and upwardly into the corral or the holding pen and over the back of the cow when the cow moves through the frame opening and into the corral or the holding pen whereupon, after passage of the cow under the gate, the gate returns to the first position;

at least one stop member connected to at least one of the frame and the gate for preventing outward movement of the gate and thereby preventing escape of the captured cow through the frame opening;

a first extension member connected to the first side member of the frame such that the first extension member extends outwardly from the first side member a second extension member connected to the second side member of the frame such that the second extension member extends outwardly from the second side member; and connector assemblies for connecting the first and second extension members to the adjacently disposed support structures defining the access opening to the corral or holding pen.

6. The portable gate assembly for use in combination with a corral or holding pen of claim 5 wherein the first and second extension members are provided with a sufficient length to enhance connection of the first and second extension members and the frame to the adjacently disposed support structures defining the access opening to the corral or holding pen, and wherein at least two spatially disposed first connector assemblies are provided for connecting the first extension member to the adjacently disposed support structure and at least two spatially disposed second connector assemblies are provided for connecting the second extension member to the adjacently disposed support structure, and wherein each of the first connector assemblies comprises:

a plate extending between the first side member and the first extension member, the plate having a substantially v-shaped notch formed in a upper side of the plate; and a chain having one end thereof connected to one of the plate or the first extension member in close proximity to the plate, the chain having a sufficient length so that the chain can be wrapped around the adjacently disposed support member and connected to the plate by positioning chain in the substantially v-shaped notch of the plate; and wherein each of the second connector assemblies comprises:

a plate extending between the second side member and the second extension member, the plate having a substantially v-shaped notch formed in a upper side of the plate; and a chain having one end thereof connected to one of the plate or the second extension member in close proximity to the plate, the chain having a sufficient length so that the chain can be wrapped around the adjacently disposed support member and connected to the plate by positioning the chain in the substantially v-shaped notch of the plate.

7. A portable gate assembly for use in combination with a corral or holding pen to capture wild or renegade cows, the portable gate assembly comprising:

a frame connectable to a support structure defining an access opening to a corral or holding pen, the frame having a frame opening extending there through, the frame opening sized such that a cow sought to be captured can pass through the frame opening and into the corral or holding pen;

a gate having an upper end and a lower end, the upper end of the gate pivotally connected to the frame such that the gate is selectively movable between a first position and a second position, in the first position the gate being positioned in at least a portion of the frame opening such that the lower end of the gate is disposed a sufficient distance above the ground to permit at least a portion of the cow's head to be positioned thereunder, in the second position the gate being moved inwardly and upwardly into the corral or the holding pen and over the back of the cow when the cow moves through the frame opening and into the corral or holding pen whereupon, after passage of the cow under the gate, the gate returns to the first position; and wherein the gate further comprises;

a first side member having a first end and a second end;

a substantially parallel, spatially disposed second side member having a first end and a second end;

a lower end member extending between and connected to the first ends of the first and second side members;

an upper end member extending between and connected to the second ends of the first and second side members; and a plurality of cross brace members extending between and connected to the first and second side members, the cross brace members being disposed between the lower end member and the upper end member so as to provide structural integrity to the gate and to provide a barrier to prevent the cow from exiting the corral or holding pen via the gate and the frame opening;

at least one stop member connected to at least one of the frame and the gate for preventing outward movement of the gate and thereby preventing escape of the captured cow through the frame opening; and a hinge assembly for pivotally connecting the gate to the frame whereby the gate is selectively movable between the first position and the second position, the hinge assembly comprising:

a substantially horizontally disposed cross brace member having a first end and an opposed second end, the first end of the substantially horizontally disposed cross brace member connected to the first side member of the frame and the opposed second of the substantially horizontally disposed cross brace member connected to the second side member of the frame such that the substantially horizontally disposed cross brace member is disposed a distance above the upper end of the gate;

at least one sleeve rotatably supported on the substantially horizontally disposed cross brace member; and at least one linkage member connected to the upper end of the gate and to the at least one sleeve so that the gate can be selectively moved between the first position and the second position.

* * * * *